United States Patent
Chavan Dafle et al.

(10) Patent No.: US 12,441,004 B2
(45) Date of Patent: Oct. 14, 2025

(54) ROBOTIC GRIPPERS

(71) Applicant: Massachusetts Institute of Technology, Cambridge, MA (US)

(72) Inventors: Nikhil Chavan Dafle, Jersey City, NJ (US); Alberto Rodriguez Garcia, Cambridge, MA (US); Neel Doshi, Cambridge, MA (US); Ian Hernand Taylor, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1040 days.

(21) Appl. No.: 17/469,196

(22) Filed: Sep. 8, 2021

(65) Prior Publication Data

US 2022/0105642 A1   Apr. 7, 2022

Related U.S. Application Data

(60) Provisional application No. 63/088,113, filed on Oct. 6, 2020.

(51) Int. Cl.

| | |
|---|---|
| *B25J 15/08* | (2006.01) |
| *B25J 9/16* | (2006.01) |
| *B25J 15/00* | (2006.01) |
| *B25J 19/00* | (2006.01) |
| *F16D 49/00* | (2006.01) |

(Continued)

(52) U.S. Cl.
CPC ......... *B25J 15/0004* (2013.01); *B25J 9/1612* (2013.01); *B25J 15/0038* (2013.01); *B25J 15/08* (2013.01); *B25J 19/0004* (2013.01); *F16D 49/00* (2013.01); *F16D 55/02* (2013.01);

(Continued)

(58) Field of Classification Search
CPC .... B25J 15/0004; B25J 15/0038; B25J 15/08; B25J 9/1612; F16D 49/00; F16D 55/02; F16D 2121/08; G05B 2219/39001; G05B 2219/39466
See application file for complete search history.

(56) References Cited

U.S. PATENT DOCUMENTS

| | | | |
|---|---|---|---|
| 4,613,277 A * | 9/1986 | Guay | B25J 15/0475 294/902 |
| 7,264,436 B2 * | 9/2007 | Tillmann | B25J 9/1015 414/744.5 |

(Continued)

OTHER PUBLICATIONS

Chavan-Dafle et al., A two-phase gripper to reorient and grasp. 2015 IEEE International Conference on Automation Science and Engineering (CASE). Sweden. 2015; 1249-55.

(Continued)

*Primary Examiner* — Bradley T King
(74) *Attorney, Agent, or Firm* — Wolf, Greenfield & Sacks, P.C.

(57) ABSTRACT

A robotic gripper may be configured to dexterously manipulate an article. The robotic gripper may include two or more fingers containing one or more rotatable contacts each. The rotatable contact may transition between a rotation mode and a braking mode such that the contacts are free to rotate in the rotation mode and are prevented from being rotated in the braking mode. In some instances, the robotic gripper may make contact with the article via the contact pads. Thus, the robotic gripper may dexterously manipulate the article via the contact pads and brake.

18 Claims, 6 Drawing Sheets

(51) Int. Cl.
*F16D 55/02* (2006.01)
*F16D 121/08* (2012.01)

(52) U.S. Cl.
CPC ............... *F16D 2121/08* (2013.01); *G05B 2219/39001* (2013.01); *G05B 2219/39466* (2013.01)

(56) References Cited

U.S. PATENT DOCUMENTS

| | | | |
|---|---|---|---|
| 11,247,345 B2* | 2/2022 | Chavan Dafle | B25J 15/0023 |
| 2017/0087728 A1* | 3/2017 | Prahlad | B25J 15/0085 |
| 2017/0328149 A1* | 11/2017 | Søyland | B25J 19/0045 |
| 2019/0077028 A1* | 3/2019 | Golan | B25J 15/0009 |
| 2023/0271319 A1* | 8/2023 | Yamamoto | B25J 9/1635 |
| | | | 700/245 |

OTHER PUBLICATIONS

Chavan-Dafle et al., Pneumatic shape-shifting fingers to reorient and grasp. 2018 IEEE 14th International Conference on Automation Science and Engineering (CASE). Germany. 2018; 988-93.

Hou et al., Fast planning for 3d any-pose-reorienting using pivoting. 2018 IEEE International Conference on Robotics and Automation (ICRA). Australia. 2018; 1631-8.

Taylor et al., PnuGrip: An Active Two-Phase Gripper for Dexterous Manipulation. 2020 IEEE/RSJ International Conference on Intelligent Robots and Systems (IROS). 7 pages.

Terasaki et al., Motion planning of intelligent manipulation by a parallel two-fingered gripper equipped with a simple rotating mechanism. IEEE Transactions on Robotics and Automation. Apr. 1998; 14(2): 207-19.

* cited by examiner

ROBOTIC GRIPPERS

CROSS-REFERENCE TO RELATED APPLICATIONS

This application claims the benefit under 35 U.S.C. § 119(e) of U.S. provisional application Ser. No. 63/088,113, filed on Oct. 6, 2020, the disclosure of which is incorporated herein by reference in its entirety.

FIELD

Disclosed embodiments relate to robotic grippers, for example, for dexterously manipulating one or more articles.

BACKGROUND

A few part geometries and tools make up a large share of tasks in industrial assembly. Cylindrical objects, followed by prismatic ones, have been identified as predominant part shapes that are encountered in manufacturing industries. Grippers play a major role in the handling of these objects. Most of these grippers are two-finger grippers, mostly in a parallel-jaw form. However, a parallel-jaw gripper often compromises the dexterity of part handling for the benefit of simplicity and robustness. A common task of grasping a cylindrical object lying horizontally on a surface in an upright configuration is conventionally accomplished with industrial robots supported with part feeders which take care of reorienting the parts for manipulation by the gripper.

BRIEF SUMMARY

In some embodiments, a robotic gripper includes at least two gripper fingers, each gripper finger including a body portion, a rotatable contact configured to contact an article and operatively connected to the body portion, and a brake configured to selectively maintain a fixed orientation of the rotatable contact relative to the body portion when engaged.

In some embodiments a method of operating a robotic gripper includes: gripping an article between at least two rotatable contacts of a gripper in a first orientation; rotating the at least two rotatable contacts to pivot the article into a second orientation; and preventing rotation of the at least two rotatable contacts to maintain the article in the second orientation.

In some embodiments, a method of operating a robotic gripper includes: gripping an article between at least two rotatable contacts of a gripper in a first orientation, wherein gripping the article includes applying a gripping force to the article via the at least two rotatable contacts of the gripper; and selectively applying a braking force to the contact pads to maintain the orientation of each rotatable contact relative to the associated gripper, wherein the braking force is independent of the gripping force.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
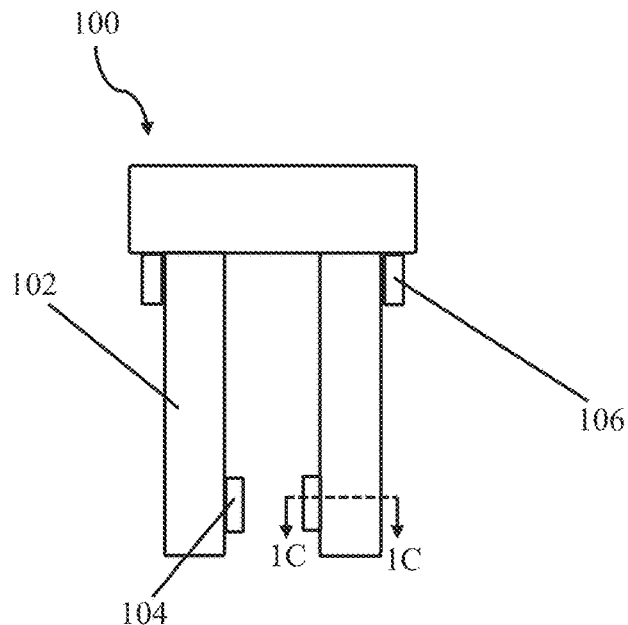
FIG. 1A is a front view of a robotic gripper according to one illustrative embodiment.

In some applications, for example in the field of industrial assembly, it may be desirable to employ a robotic gripper capable of dexterously manipulating an article. Dexterous manipulation often involves moving an object in a robotic gripper, usually through interactions with contact points disposed on the robotic gripper. Such interactions may generally be controlled according to a predetermined plan. However, planning and controlling these interactions may involve planning contact locations and modes of operation (e.g., sliding, sticking, rolling, pivoting). However, using conventional systems, it may be challenging to enforce a sequence of planned motions according to a predetermined mode or modes of operation. Custom gripper hardware can assist with enforcing a sequence of planned motions; however, currently available robotic gripper systems generally involve having a user manually set movement parameters before performing a dexterous manipulation of an article, depending on the article. For example, a user may have to input different parameters into a conventional robotic gripper when manipulating articles of different masses. The need to input parameters into a robotic gripper may prevent a robot from handling multiple objects on-the-fly (i.e., without parameter tuning).

In view of the above, the Inventors have recognized the advantages of a robotic gripper capable of controlling the orientation of a range of different objects grasped by the robotic gripper, which in some embodiments may be done without prior tuning or adjustment. Accordingly, the Inventors have recognized the benefits associated with a robotic gripper that is capable of manipulating an article in two modes of operation: a rotation mode and a braking mode.

Such a robotic gripper may grip an article between a pair of fingers via a pair of contact pads disposed on the pair of fingers. The robotic gripper may include one or more brakes associated with the contact pads such that the contact pads may be selectively rotated or held stationary. This may correspondingly result in the object being free to rotate in the rotation mode or being held stationary in a fixed orientation in the braking mode. The robotic gripper may be capable of selectively activating or deactivating the one or more brakes to transition between the two states. Thus, such a robotic gripper may be capable of performing a series of dexterous operations on an article, for example, gripping the article, lifting the article, rotating the article, and placing the article.

In some embodiments, a robotic gripper may include at least two gripper fingers suitable for gripping an article. Each gripper finger may include a body portion, a contact, and a brake. The contact may be operatively connected to the body portion such that the contact is rotatable relative to the body. In turn, the brake may be operatively coupled to the contact and the body portion of the associated finger such that the brake may selectively engage and disengage the contact. When the brake is engaged, the brake may prevent the contact from rotating, such that the brake may hold the contact in a fixed orientation relative to the body portion. Relatedly when the brake is disengaged, the contact is free to rotate relative to the body portion. In some instances, the contact pads may serve as contact points to contact the article when the gripper fingers grip the article. Particularly, the gripper fingers may be displaced towards one another to grip the article such that the robotic gripper makes contact with the article via the contact pads with the article compressed between opposing contact pads located on opposing fingers disposed on either side of an article. Thus, the robotic gripper may selectively control the movement of the article via the contact pads. In some instances, the article may rotate under its own mass due to gravity in the rotation mode (e.g., when the gripper grips the article at a point away from the article's center of mass), and the article may remain in a fixed orientation when the brakes are engaged in the braking mode.

Without wishing to be bound by theory, the ability to control the braking force and compressive forces applied to an article held in a gripper as disclosed herein may be advantageous in some embodiments. For example, a gripper as disclosed herein may apply a compressive gripping force to an article by controlling a compressive force applied by the opposing fingers gripping an article. Separately, the braking force applied to maintain the article in a desired orientation may be controlled using the associated brakes located on one or more of the fingers. Accordingly, the braking force used to hold the article in a particular orientation may be independent of a force that the grippers may apply to the article to grip the article so long as the applied force is sufficient to prevent slipping of the article within the gripper.

As noted above, a robotic gripper according to the present disclosure may include any number or type of appropriate brakes for holding an associated contact pad in a fixed orientation relative to a gripper finger body. For example, in some embodiments, the brake associated with a particular contact pad may take the form of a shaft brake. In some instances, each contact pad may include a shaft extending from the body of the contact pad into the body of an associated gripper finger. As the contact pad rotates, it may rotate about a longitudinal axis of the shaft. In turn, the brake may include one or more brake pads that are constructed to be selectively biased against the shaft to selectively apply a torque to the shaft to prevent the shaft from rotating. Alternatively, the brake may take the form of a disk brake. In such instances, the stopping mechanism may be constructed to apply a torque directly to a surface of the contact pad, such as an internal surface of the contact pad, or other appropriate structure operatively connected to the contact pad to prevent the contact from rotating. Of course, the brake need not be a disk brake or a shaft brake, as other brakes are also contemplated.

In some embodiments, the stopping mechanism used in the brake may take the form of one or more pneumatic diaphragms. To engage the stopping mechanism, the one or more pneumatic diaphragms may be inflated so as to make contact with a braking surface (e.g., shaft or disk) operatively connected to a contact to apply a braking torque to the contact via friction. Relatedly, to disengage such a brake, the one or more pneumatic diaphragms may be deflated, such that the one or more pneumatic diaphragms no longer make contact with the braking surface (e.g., shaft or disk). Thus, the one or more pneumatic diaphragms no longer apply the torque to the braking surface.

In yet another embodiment, a brake may be constructed to apply a braking torque to a contact via electroadhesion. In such an embodiment, the brake may include one or more conductive surfaces on both the contact and the body. These surfaces may be separated by an insulating material (i.e., a dielectric) such that the force between the surfaces applies an electrical torque to a braking surface operatively connected to a contact such that when either the surface, or surfaces, on the body or the surface, or surfaces, on the contact are electrically charged the contact is prevented from rotating. Relatedly, the brake may be disengaged by removing the electrical charge from the conductive surface, thus, removing the electrical torque from the braking surface and allowing the contact to rotate. Of course, the stopping mechanism need not be a pneumatically actuated mechanism or an electroadhesively actuated mechanism.

While specific types of brakes are disclosed herein relative to various embodiments, it should be understood that the embodiments of robotic grippers disclosed herein are not limited to any particular type of brake used to selectively permit and prevent rotation of an article gripped by a robotic gripper. Accordingly, any appropriate type of brake capable of selectively applying and removing a braking torque from a contact to selectively permit and prevent rotation of an article may be used as the disclosure is not so limited.

As noted above, a robotic gripper according to the present disclosure may include any number and/or construction of contact pads appropriate for making contact with and gripping an article. In some embodiments, a contact pad may be disposed on a body of a gripper finger such that two or more gripper fingers with contact pads of a robotic gripper may be configured to grasp an article due to the friction force between the article and the contact pads of the gripper fingers. For example, to grasp an article, the robotic gripper may position the gripper fingers on two opposing surfaces of the article. The gripper fingers may then move towards one another until the contact pads located on the gripper fingers each make contact with the article on the opposing surfaces such that the article is disposed between the contact pads located on the two opposing fingers. Depending on the particular application, the contact pads may be formed of plastic, metal, composites, and/or any other suitable material as the disclosure is not limited to any particular material of the contact pads. Additionally, the contact pads may be manufactured using any appropriate manufacturing method and may have any appropriate size and/or shape for a desired application as the disclosure is not so limited.

As noted above, in some embodiments, it may be desirable for a robotic gripper to independently control a braking force and a gripping force applied to an article during manipulation of the article. For example, the robotic gripper may be capable of manipulating the article by applying or removing a braking force from a contact (e.g., the contacts described above) that is independent of a force used to grip the article between the two or more fingers. Specifically, in some embodiments, the robotic gripper is capable of actively transitioning between a braking mode of operation and a rotation mode of operation as described above. Without wishing to be bound by theory, such a transition may be independent of the grasping force applied to the article. For example, the robotic gripper may be capable of selectively disengaging or applying one or more brakes associated with the contact pads of a gripper to permit or prevent rotation of an article while independently controlling the grip force applied to the article held between the two or more contact pads of the gripper. Independently operating the one or more brakes of a robotic gripper relative to the gripping force applied by the gripper fingers may allow the robotic gripper to dexterously manipulate a variety of types of articles without recalibration and/or additional programming by an operator.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
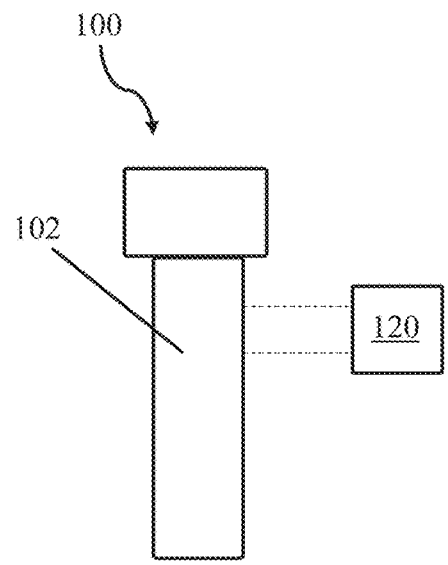
FIG. 1B is a side view of the robotic gripper of FIG. 1A.

FIGS. 1A-1B are front and side views respectively of one embodiment of a robotic gripper 100. In some embodiments, the robotic gripper 100 includes two or more gripper fingers 102, two or more contact pads 104, and one or more actuators 106. In the depicted embodiment, the two contact pads are disposed on opposing surfaces of the two depicted gripper fingers such that the contact pads are oriented towards one another. Additionally, the one or more actuators may be operatively coupled to at least one of the fingers such that the one or more actuators are configured to displace the two or more fingers towards one another such that an article disposed between the contact pads may be compressed therebetween. For example, an article may be gripped between the fingers when the actuator displaces the two or more fingers 102 towards one another until the two or more fingers 102 make contact with the article. In some embodiments, the robotic gripper 100 may include exactly two gripper fingers 102 (e.g., a first gripper finger and a second gripper finger). In such embodiments, to grip an article, the first gripper finger may move towards the second gripper finger, the second gripper finger may move towards the first gripper finger, or the first and second gripper finger may move towards one another simultaneously. In some instances, it may be desirable for the gripper fingers to grip the article at a distance away from a center of mass of the article, as described in greater detail below. However, it should be understood that an article may be grasped by a gripper at any appropriate point for a desired operation and/or reorientation of the article by the gripper.

The one or more actuators 106 may be constructed to move the two or more gripper fingers 102 towards one another in any suitable manner, including the manners described above. In some embodiments, the one or more actuators 106 may be linear actuators, though this need not be the case, as the one or more actuators may be of any suitable type. In some embodiments, the one or more actuators 106 may be mechanical actuators, pneumatic actuators, hydraulic actuators, electrical actuators, hybrid actuators, combinations of the foregoing, or any other suitable type of actuator. Accordingly, it should be understood that the one or more actuators 106 of a robotic gripper may be of any suitable type as the disclosure is not limited in this fashion.

When gripping an article, the two or more gripper fingers 102 may make contact with the article via the two or more contact pads 104. Thus, the robotic gripper 100 may be able to dexterously manipulate the article via the two or more contact pads. In some embodiments, each gripper finger of the two or more gripper fingers 102 may include a corresponding contact pad 104, though this need not be the case. In some instances, each gripper finger of the two or more gripper fingers 102 may include two, three, or more contact pads 104, depending on the application. In some instances, each gripper finger of the two or more gripper fingers 102 may include the same number of contact pads 104. In other instances, each gripper finger of the two or more gripper fingers may include differing numbers of contact pads 104, depending on the application. Additionally, in instances in which multiple contact pads are used on a single finger, the multiple contact pads may rotate about a common axis such as a common shaft, or other appropriate structure, that the contact pads are operatively connected to.

Figure 1C:
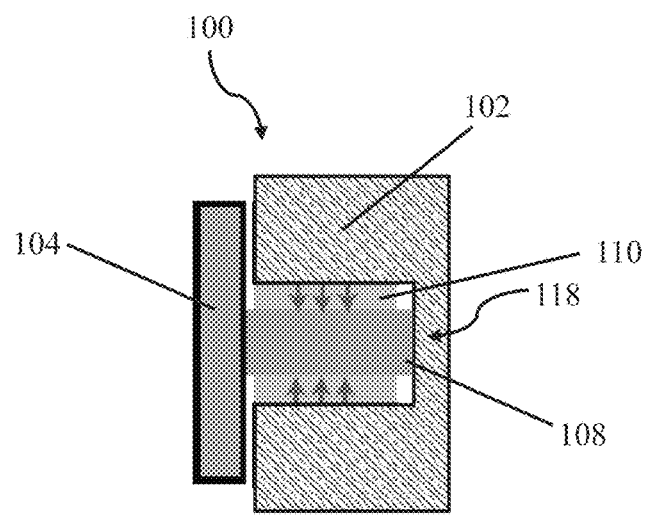
FIG. 1C is a cross sectional view of the robotic gripper of FIG. 1A.

In some embodiments, the contact pads 104 may each include a shaft 108 (as shown in FIG. 1C). In such an embodiment, the contact pads 104 may be capable of rotating about a longitudinal axis of the corresponding operatively coupled shaft. Accordingly, each of the contact pads, and an article gripped between the contact pads may be capable of rotating about the longitudinal axes of the shafts supporting the contact pads. In some embodiments, bearings, low friction materials, and/or any other appropriate materials and/or constructions may be used to facilitate rotation of a shaft or other structure relative to a supporting gripper finger to permit rotation of an associated contact pad.

Depending on the embodiment, the contact pads 104 may be formed as a rigid disk. However, the contact pads 104 may alternatively be formed from a flexible and/or deformable material. The contact pads 104 may also be formed into any suitable shape. For example, as shown in FIG. 1A, contact pad 104 may be cylindrical in shape, though this need not be the case. Contact pads 104 may be formed with a rectangular cross section, a triangular cross section, or any other suitable geometry, depending on the application. In some embodiments, the contact pads 104 may include suction cups or other active gripping mechanisms (e.g., jamming grippers), depending on the application.

In some embodiments, the robotic gripper 100 may include a processor 120 that is operatively coupled to the brakes, actuators, and/or any other appropriate component of a robotic gripper. The processor may be associated with corresponding non-transitory processor readable medium including processor readable instructions that when executed cause the robotic gripper to perform the methods disclosed herein. Accordingly, the processor may be configured to control and/or operate the robotic gripper 100 according to the methods and examples disclosed herein. For example, in some embodiments, the processor 120 may send a signal to one or more actuators 106 to control the motion of the gripper fingers 102 (e.g., as described above). The processor may also be operatively coupled to a first sensor capable of detecting where the gripper fingers 102 are located relative to one another, a force applied to an article by the fingers, and/or any other appropriate operating parameter to control the relative location of the gripper fingers 102 and/or a force applied by the gripper fingers using the actuators 106 based at least in part on the information from the first sensor. The processor may also be operatively coupled to a second sensor (e.g., an encoder, an inertial monitoring unit (IMU), hall effect sensor, optical encoder, and/or other suitable type of sensor) for detecting the orientation of the contact pads 104. Accordingly, the processor 120 may be capable of controlling the movement (e.g., rotation) of contact pads 104 based at least in part on a sensed orientation of the contact pads 104 as measured by the second sensor, and as described below in greater detail.

Figure 2:
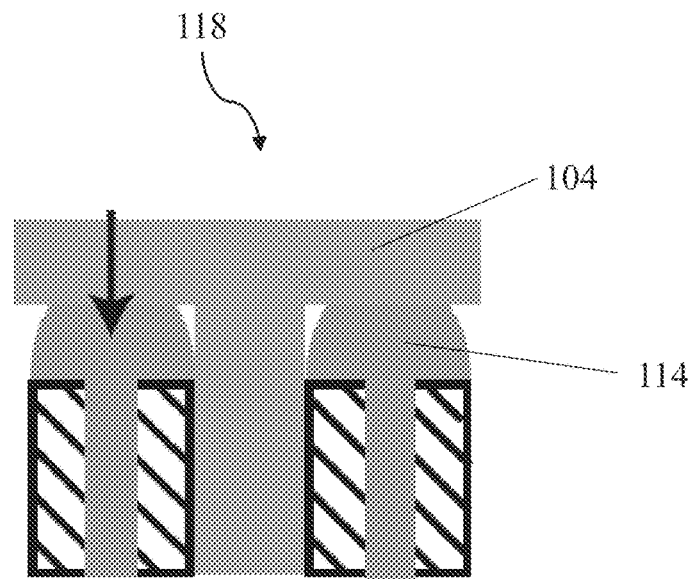
FIG. 2 is a cross sectional view of a brake of a robotic gripper according to one illustrative embodiment.
Figure 3:
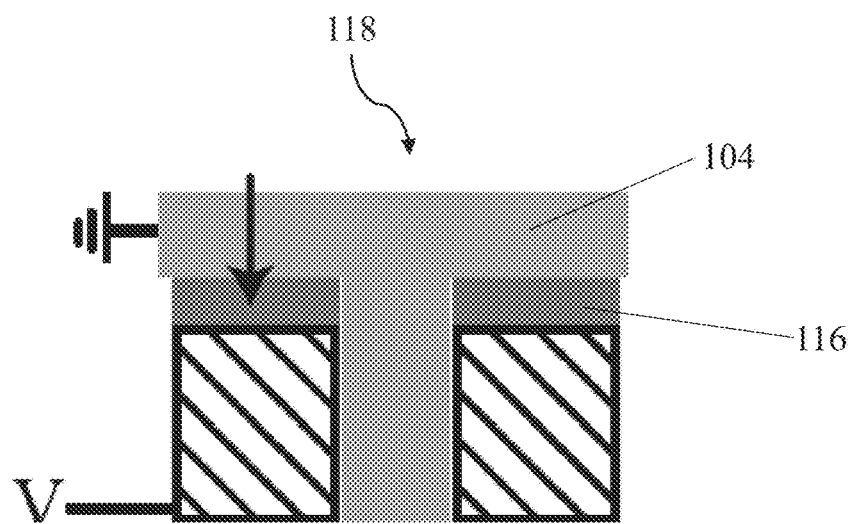
FIG. 3 is a cross sectional view of a brake of a robotic gripper according to one illustrative embodiment.

The robotic gripper 100 may further include a brake 118 for stopping the one or more contact pads 104. In some embodiments, the brake 118 may be configured as a shaft brake, as shown in FIG. 1C. Specifically, the brake 118 may include a brake pad 110 similar to a drum brake, or other structure, which is capable of being selectively engaged with and disengaged with the shaft 108 to selectively apply a friction force to the shaft to either permit or prevent rotation of the shaft and associated contact pad. Thus, the brake may be capable of transitioning between at least two states: a rotation mode and a braking mode. In the rotation mode, the brake allows shaft 108 to freely rotate, thus allowing the contact pad 104 to rotate freely, in turn. Conversely, in the braking mode, the stopper 110 may prevent the shaft 108 from rotating, thus holding the contact pad 104 in a fixed orientation. Alternatively, brake 118 may be configured as a disk brake, as shown in FIGS. 2-3. In such embodiments, the brake may also include a brake pad; however, instead of selectively engaging with the shaft, the brake pad may be configured to operatively engage with an interior surface of the contact pad to apply the desired braking torque to the contact pad to selectively permit or prevent rotation of the contact pad. Of course, a brake need not be a shaft brake or a disk brake as any appropriate type of brake capable of applying a desired braking torque to a contact pad may be used.

A brake may be actuated in a number of suitable ways. For example, in some embodiments, such as in the embodiment of FIG. 2, the brake 118 may be pneumatically actuated. Specifically, the brake 118 may include a pneumatically actuated diaphragm 114 configured to selectively engage with an opposing surface of a contact pad 104 (or the shaft 108, for example, depending on the type of brake), as described above. In some embodiments, the rotation mode, the pneumatic diaphragm 114 is deflated such that the pneumatic diaphragm 114 does not apply a force on and/or come into contact with contact pad 104. In the braking mode, the pneumatic diaphragm 114 is inflated, and thus, makes contact with the contact pad 104. Without wishing to be bound by theory, when pneumatic diaphragm 114 makes contact with the contact pad 104, pneumatic diaphragm 114 may apply a force to the surface of the contact pad 104 in a first direction that includes at least a component oriented in a direction normal to the surface of the contact pad. Thus, the pneumatic diaphragm, and/or a component attached to a surface of the pneumatic diaphragm, may apply a friction force to the corresponding surface of the contact pad 104 to apply the desired braking torque to prevent the contact pad 104 from rotating about the shaft 108.

In yet another embodiment, a brake 118 may be an electroadhesive brake as shown in FIG. 3. In such an embodiment, the brake may include a stationary component 116 at least partially formed from a dielectric material disposed on a conductive material, such as a conductive surface. In such embodiments, the conductive surface behind the dielectric material may be electrically coupled to a voltage source V which may selectively apply a desired voltage differential between the conductive surface on the body and the contact pad 104 which may also be electrically connected to the voltage source. Thus, when the voltage source V applies a sufficiently large voltage differential, the brake may apply an electromagnetic force that opposes motion of the contact pad 104. Accordingly, when the voltage potential is removed, or reduced to below a voltage potential sufficient to prevent movement of the contact pad, the brake may transition to a rotation mode where the contact pad rotates relative to the associated gripper finger. Thus, the applied voltage potential may be used to selectively permit or prevent rotation of the contact pad.

While pneumatic and electroadhesive brakes are described above, it should be understood that any suitable type of brake and/or method for actuating a brake may be used as the disclosure is not so limited. For example, other appropriate methods for actuating a brake may include, but are not limited to, piezoelectric, electromechanical, hydraulic, electrostatic based brakes, and/or any other appropriate type of brake capable of maintaining an article in a desired orientation while gripped by a gripper.

Figure 4:
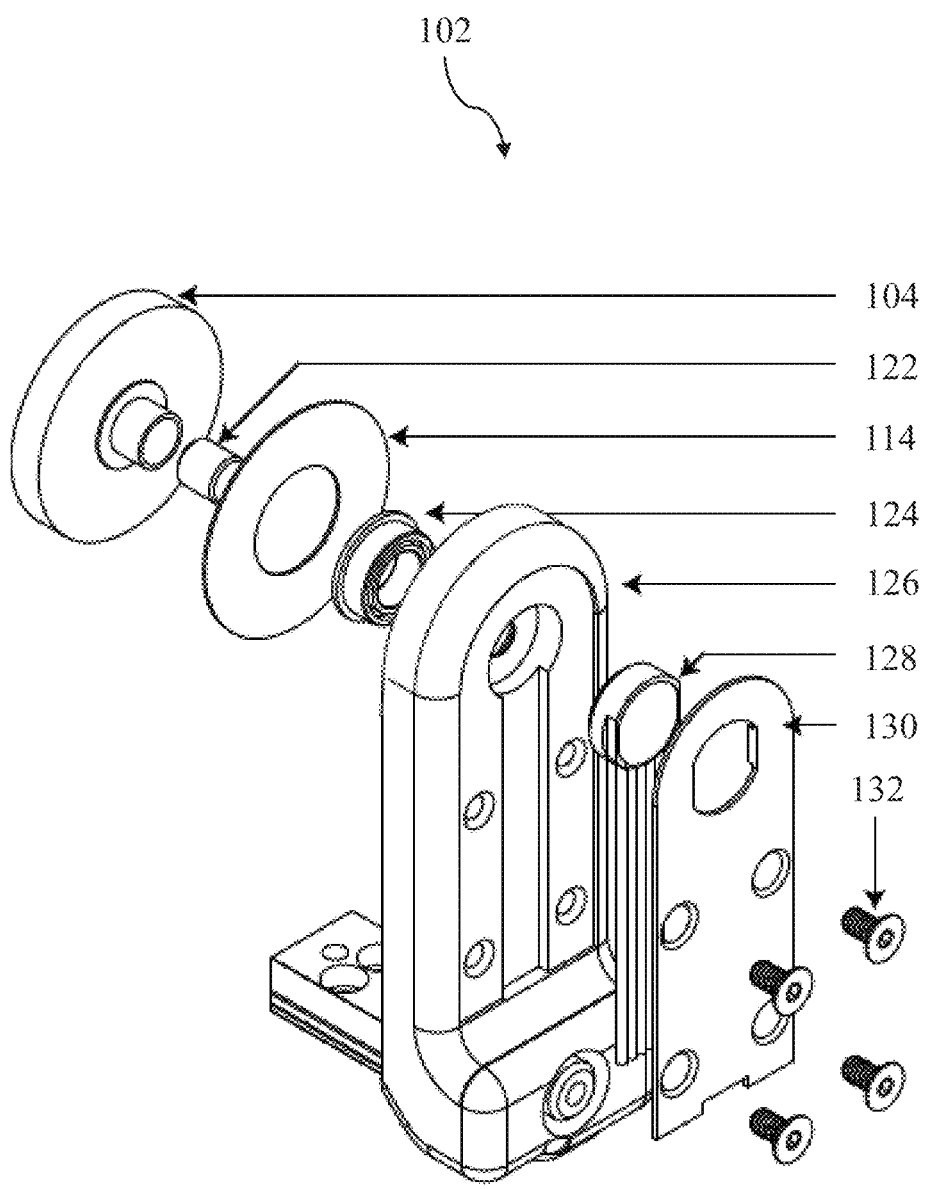
FIG. 4 is an exploded view of a finger of a robotic gripper according to one illustrative embodiment.

FIG. 4 is an exploded perspective view of one embodiment of a gripper finger 102. In some embodiments, the gripper finger 102 may include a contact pad 104, a first sensor, a diaphragm 114, a bearing 124, a finger body 126, a cover plate 130, and fasteners 132. In some embodiments, the first sensor may be configured to sense motion of the contact pad relative to the finger body. In the depicted embodiment, the first sensor may be an encoder including an encoder magnet 122 and a magnetic sensor 128. However, other appropriate sensors configured to sense relative motion of the contact pad and finger body may also be used as the disclosure is not so limited. In some embodiments, the bearing 124 may be a ball bearing, though bearing 124 may alternatively be a magnetic bearing, a roller bearing, a plain bearing, a journal bearing, and/or any other suitable bearing, depending on the application.

In some embodiments, the gripper finger 102 may be manufactured in the following manner. The bearing may be press fit into, or otherwise attached to, the finger body 126. The diaphragm 114 may then be placed, and in some instances bonded to, the finger body 126 at a location that will be disposed between the finger body and a portion of the contact pad 104 in the assembled state. The encoder magnet 122, or other appropriate sensor, may be inserted into a hollow axle of the contact pad 104 and bonded in place. The contact pad 104 and finger body 126 may then be press fitted together. The magnetic sensor 128 may be assembled with the finger body 126 in an appropriate location to sense relative motion of the corresponding encoder magnet. The cover plate 130 may then be attached to the finger body using fasteners 132 and/or any other appropriate attachment method.

In some embodiments, the gripper finger 102 includes a single bearing 124, though this need not be the case. In certain applications, for example heavy duty applications requiring increased robustness, the gripper finger may include two, three, four, or any other appropriate number of bearings.

While not depicted in the figures, in some embodiments, the gripper fingers may also include a sensor operatively coupled to the brake and/or contact pads such that the sensor is configured to sense torque applied to an associated article gripped by a robotic gripper between the associated contact pads. Additionally, in some embodiments the gripper fingers may include force sensors operatively coupled to the fingers and/or contact pads that are configured to sense a compressive force applied to an article disposed between the contact pads of two or more associated gripping fingers. In some embodiments, the force and/or torque signals from these sensors may be output to a processor of a robotic gripper which may use the signals to determine the motion, orientation, or other appropriate parameter relating to an article gripped by the robotic gripper.

In some embodiments, the robotic gripper 100 includes an external vision sensor (e.g., a camera) to observe the article in real time as the robotic gripper 100 manipulates the article.

Figure 5A:
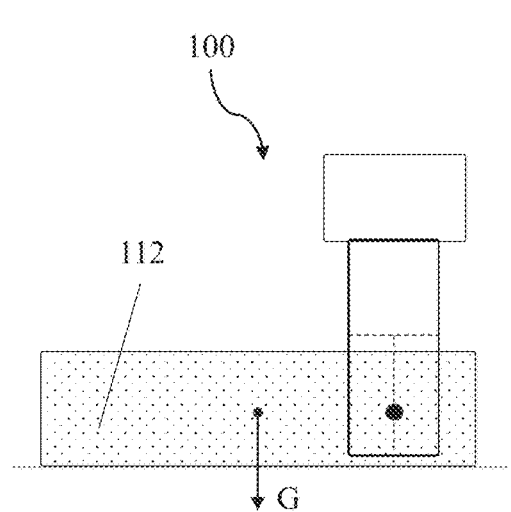
FIG. 5A is a side view of a robotic gripper gripping an article according to one embodiment.
Figure 5B:
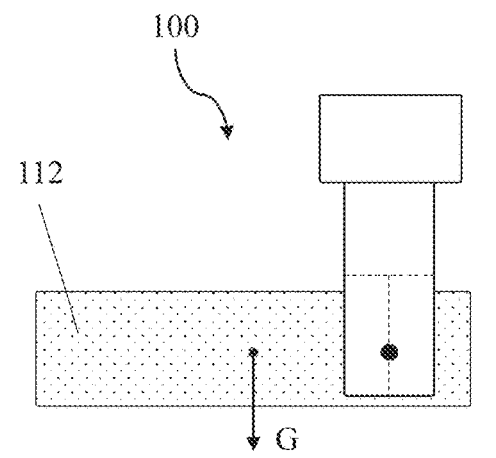
FIG. 5B is a side view of the robotic gripper lifting the article of FIG. 5A.
Figure 5C:
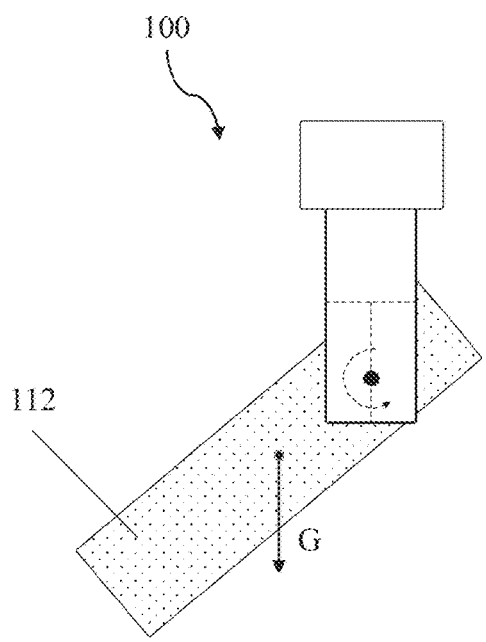
FIG. 5C is a side view of the robotic gripper pivoting the article of FIG. 5A.
Figure 5D:
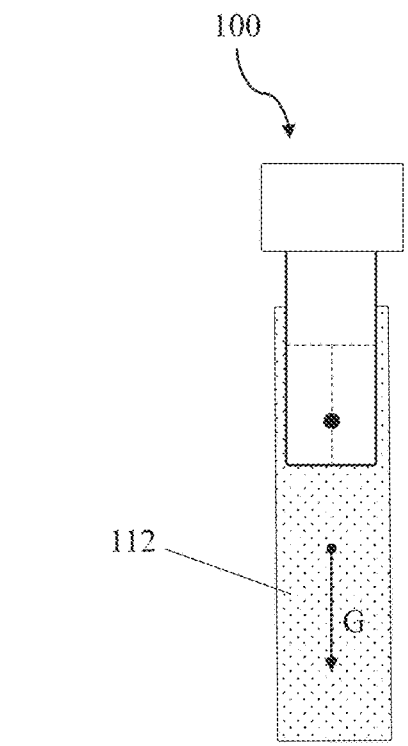
FIG. 5D is a side view of the robotic gripper placing the article of FIG. 5A.

FIGS. 5A-5D shown a robotic gripper 100 performing an exemplary dexterous manipulation operation on an article 112. For example, as shown in FIG. 5A, the robotic gripper 100 may begin a dexterous manipulation operation by gripping the article 112 (e.g., using the gripper fingers 102 and actuators 106 as described above) to compress the article between two opposing contact pads disposed on the two opposing fingers as previously described, not depicted. Next, as shown in FIG. 5B, the robotic gripper 100 may lift, or otherwise translate, the article while it is held rotationally stationary in a first orientation (e.g., by engaging a brake operatively coupled with the contact pads as described above). The robotic gripper 100 may then rotate the article 112 from the first orientation to a second orientation. For example, the article 112 may rotate under a force of gravity G when the robotic gripper 100 grips the article 112 at a point distant from the center of mass of the article 112 when the brake 118 is disengaged, as shown in FIG. 5C. Thus, the center of gravity may be offset from the grip location such that the mass of the article induces a torque that results in rotation of the under the force of gravity G. In some embodiments, the rotation may be permitted to continue until the center of gravity of the article 112 is vertically below the contact pads 104 of the robotic gripper 100, though instances in which the brake is reengaged to stop the rotational motion of the article prior to being in the lowest energy state with the center of gravity vertically aligned with the contact pads are also contemplated. The robotic gripper 100 may then place the article 112 in the second orientation in a desired location, as shown in FIG. 5D.

Though the brake may be discretely engaged and disengaged in the above described methods of operation, it may also be operated in a continuous fashion when operatively connected to a pressure regulator or other suitable actuator in some embodiments. For example, the pressure regulator may make robotic gripper 100 capable of continuously controlling the pressure inside the diaphragm 114, which may control the effective braking force. Such a system may allow the robotic gripper 100 to continuously control and tune a damping of the rotation of the contact pads 104. Thus, robotic gripper 100 may be capable of smoothly and gently rotating the article 112 into any suitable orientation. Alternatively, the brakes may either be engaged or disengaged without continuous control of the braking force between these two configurations. In either case, depending on the masses, article dimensions, component sizes, and other appropriate operating parameters, the motion of an article from a first orientation to a second orientation may either be under damped, over damped, or critically damped depending on the desired operating characteristics of a system.

In some of the embodiments described above, the robotic gripper 100 uses exclusively a force of gravity G to manipulate the article 112. However, this need not be the case. The robotic gripper 100 may include features to impart inertia to the article 112 when gripped. Thus, the robotic gripper 100 may rotate the article 112 and then selectively engage the brake 118 to fix the article 112 in a desired orientation.

Figure 6:
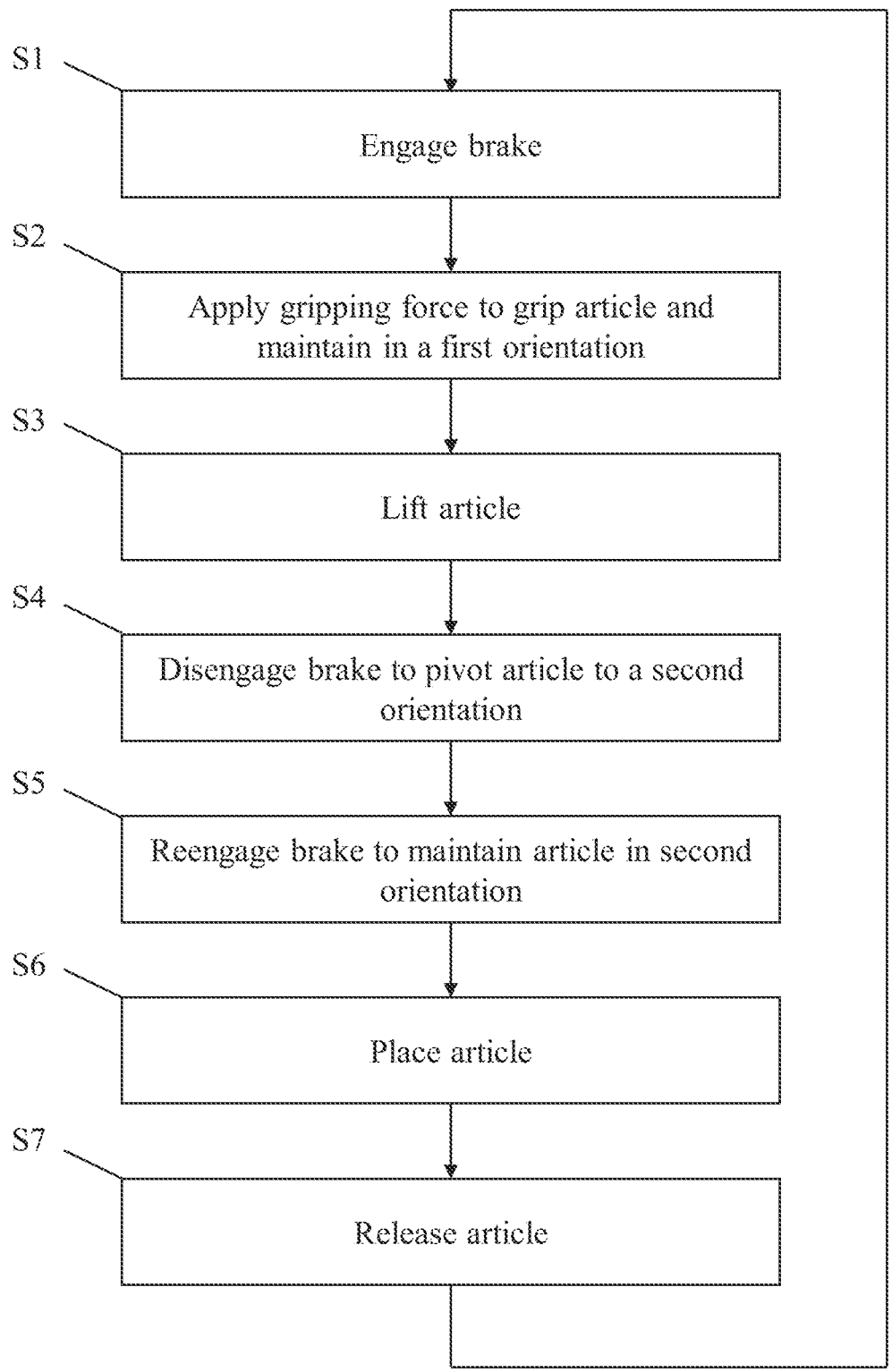
FIG. 6 is a flowchart showing the steps of a method performed by a robotic gripper according to one illustrative embodiment.

FIG. 6 is a flowchart showing one embodiment of a method including steps that a processor of a robotic gripper may execute to perform a dexterous manipulation operation on an article. At step S1, the robotic gripper may engage a brake as described above to maintain contact pads of a robotic gripper in a first orientation. Then, at step S2, the robotic gripper may use gripper fingers to apply a gripping force to the article to grip the article between the opposing contact pads of the fingers of the gripper as described above. Further, at step S2, the brake may remain engaged to maintain the article in a first initial orientation in which it is gripped. At step S3, the robotic gripper may then lift the article above a surface, or otherwise translate the article in a desired direction, while maintaining the article in the first orientation (e.g., by keeping the brake engaged). At step S4, after the article is lifted, the robotic gripper may then pivot the article from the first orientation to a second orientation. The robotic gripper may reorient the article by disengaging the brake, and thus, allowing free rotation of the contact pads and the article gripped therebetween. Accordingly, the article may reorient under the force of gravity G such that the center of gravity of the article moves vertically downwards as the article rotates. In some embodiments, this reorientation may continue until the center of gravity is vertically below the contact pads relative to a local direction of gravity. Though instances in which a desired second orientation of the article is at a rotational position between the first initial orientation and a rotational position with the center of gravity vertically below the contact pads are also contemplated. In either case, at step S5, once the article is in the second orientation, the robotic gripper may then hold the article in the second orientation by reengaging the brake. At step S6, the robotic gripper may then place the article in the second orientation and subsequently release the article at step S7 by moving the gripper fingers apart to move the contact pads out of contact with the article and release the article in the desired location and orientation.

As noted previously, in some embodiments, a robotic gripper may be operatively coupled with a processor that may be configured to control the robotic gripper to perform the steps of any suitable dexterous manipulation operation, including the operation described above.

Example: Measuring Gripper Performance

To evaluate a robotic gripper according to the present disclosure, the Inventors performed an experimental characterization of an experimental robotic gripper for three performance measures: (a) holding torque in the brake phase as a function of supplied pressure, (b) diaphragm void time as a function of supplied pressure, and (c) rotational resistance in the free phase as a function of grasp force. The Inventors used a single experimental setup to collect data regarding the three performance measures, as described below. The Inventors mounted a robotic gripper having two gripper fingers on a parallel-jaw gripper of an ABB Yumi robot. Additionally, the Inventors used a torque gauge (weighing 9 g) with notches for holding precision weights at intervals of 1 cm. The Inventors further used a positioning fixture to ensure that the initial angle of the gauge was consistent across all experiments. The inflation of the diaphragm was controlled using a solenoid valve triggered by 24V digital I/O signal from the YuMi Robot controller. The supplied pressure was varied via a manual air regulator between different experiments. The experimental robotic gripper further included an encoder in one of the gripper fingers to sense an orientation of the contact pads. Encoder data was collected from one of the gripper fingers using the RLS E201 encoder interface. The experimental procedure was automated to trigger the pneumatic actuation and collect the encoder readings with their respective timestamps.

The inventors measured the frictional torque in the brake phase. The Inventors measured brake torque for four supplied pressure values evenly spaced between 2.5 psi to 12.5 psi. For each pressure, the gripper finger was loaded with a 20 g weight at five equally spaced distances between 2 cm to 10 cm. The gauge was then held against the positioning fixture to set the initial angle, and the diaphragm was inflated, braking the contact pads. The Inventors then released the gauge and used the encoder data to record the final measured angle. If the gauge did not rotate more than 5 degrees, the corresponding brake torque was recorded. The inventors observed that the brake torque linearly increased with the supplied pressure as expected from the model shown in FIG. 7. This characterization may be helpful in determining the minimum operating pressure for a desired brake toque. A similar procedure to that previously described was used to characterize the time required for deflating the diaphragm (void time) as a function of the supplied pressure. For these experiments, the same four pressure values were used with no additional weight on the torque gauge. The Inventors conducted three trials for each supplied pressure. The void time was measured as the time between when brake was released by digital trigger and when the encoder measured that the gauge had rotated by 45 degrees. The 45-degree angle was selected as a conservative estimate that the diaphragm had completely deflated. Finally, the Inventors evaluated the rotational resistance in the free phase as a function of gripping force. For these experiments, four grasp force values were chosen in increments of 5N from 5N to 20 N. No additional weights were added to the gauge to test for the minimum loading case. The Inventors visually observed that in the free phase, the gauge rotates freely in the grasp irrespective of the grasping force.

In a second set of experiments, the Inventors observed that the void time is almost constant for different brake pressures and is approximately 0.2 seconds. Given that the diaphragm can be inflated almost instantaneously, the Inventors noted that the robotic gripper may toggle between the free and brake phases at about 5 Hz.

Figure 7:
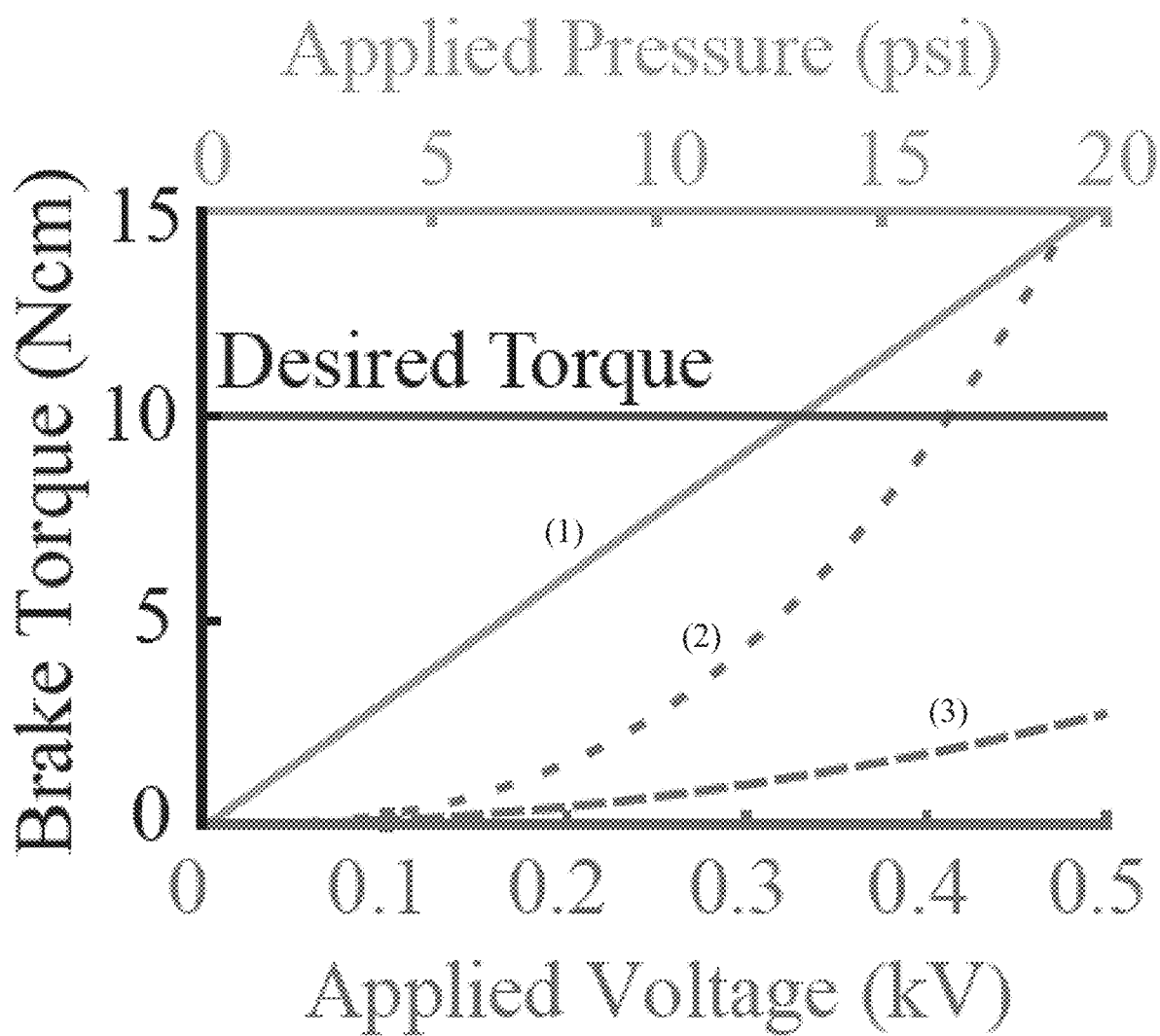
FIG. 7 is a graph comparing the brake parameters of three embodiments of brakes suitable for use with a robotic gripper according to the present disclosure.

FIG. 7 is a graph showing the braking performance of a brake in three different applications: (1) a pneumatic braking application, (2) a compliant electroadhesive braking application, and (3) a rigid electroadhesive application. As will be appreciated from the graph, in the pneumatic application, brake torque increased linearly as a greater pneumatic pressure was applied within the braking system. With respect to both electroadhesive applications, brake torque increased non-linearly as an applied voltage was increased, though the compliant electroadhesive application may provide a greater braking torque per the applied voltage, depending on the application.

Example: Experimental Gripping Tasks

The Inventors have also noted the utility of a robotic gripper, according to the embodiments disclosed herein, in a number of manually scripted demonstrations. The first was a "lab-automation" task. In the lab automation task, the experimental robotic gripper picked up a glass test tube (mass=7.5 g, length=10 cm) from a table in the braked mode. The brake then transitioned to the rotation mode. Thus, the test-tube rotated 90 degrees to align with the direction of gravity. Finally, the robotic gripper placed the test-tube in a rack. The design of the gripper fingers enabled this task, as the gripper fingers may grasp the test tube with low force to prevent damage to the test tube, while also exerting the brake force on the contact pads as may be needed to hold the tube at a desired angle (i.e., a fixed orientation). The low rotational friction in the rotation mode enabled pivoting of the test tube, and the thin profile of the gripper fingers allowed for placement of a test-tube between two tightly arranged tubes.

The Inventors further conducted a similar pick-pivot-place experiment with a cylindrical object (mass=7.2 g, length=7.5 cm) in a peg-in-hole setting. Also, the Inventors performed a pick-pivot-place experiment with a heavier prismatic object (mass=15.2 g, length=7.5 cm). These experiments demonstrated that a robotic gripper according to the present disclosure may grasp, hold, and rotate objects with different shapes and weight without needing additional tuning when changing between types of articles.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided as a single processor or multiple processors. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a processor readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a processor readable storage medium may retain information for a sufficient time to provide processor-executable instructions in a non-transitory form. Such a processor readable storage medium or media can be transportable, such that the program or programs stored thereon can be loaded onto one or more different computing devices or other processors to implement various aspects of the present disclosure as discussed above. As used herein, the term "processor-readable storage medium" encompasses only a non-transitory processor-readable medium that can be considered to be a manufacture (i.e., article of manufacture) or a machine. Alternatively or additionally, the disclosure may be embodied as a processor readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A robotic gripper comprising:
 a first gripper finger and a second gripper finger, each of the first and second gripper fingers comprising:
  a body portion;
  a rotatable contact pad configured to contact an article and operatively connected to the body portion; and
  a brake configured to selectively maintain a fixed orientation of the rotatable contact pad relative to the body portion when engaged,
 wherein the rotatable contact pad of the first gripper finger and the rotatable contact pad of the second gripper finger are adapted to rotate relative to the first and second gripper fingers about a single common axis of rotation, and wherein the first and second gripper fingers and the brake are configured such that a braking force applied by the brake is independent of a gripping force applied to the article by the first and second gripper fingers.

2. The robotic gripper of claim 1, wherein the first and second gripper fingers are configured to be displaced towards one another to grip an article between the rotatable contact pads of the first and second gripper fingers.

3. The robotic gripper of claim 1, wherein the brake includes at least one selected from a pneumatically actuated diaphragm, a shaft brake, and a disk brake.

4. The robotic gripper of claim 1, wherein the brake includes at least one dielectric configured to prevent the rotation of a shaft through electroadhesion.

5. The robotic gripper of claim 1, wherein the robotic gripper further includes a processor configured to operate the robotic gripper.

6. The robotic gripper of claim 5, wherein the processor is configured to control the robotic gripper to perform the steps of:
 gripping an article in a first orientation;
 translating the article;
 pivoting the article between the first orientation and a second orientation; and
 placing the article in the second orientation.

7. The robotic gripper of claim 6, wherein the processor is configured to perform the step of pivoting the article between the first orientation and a second orientation by disengaging the brake.

8. The robotic gripper of claim 7, wherein the processor is configured to perform the step of pivoting the article between the first orientation and a second orientation under a gravitational field.

9. The robotic gripper of claim 7, wherein the processor is configured to perform the step of reengaging the brake before placing the article in the second orientation.

10. A method of operating a robotic gripper comprising:
 gripping an article between a first rotatable contact pad and a second rotatable contact pad in a first orientation, wherein the first and second rotatable contact pads are positioned on different gripper fingers of a robotic gripper;

engaging a brake before gripping the article between the first and second rotatable contact pads;

rotating the first and second rotatable contact pads relative to the different gripper fingers about a single common axis of rotation to pivot the article into a second orientation; and preventing rotation of the first and second rotatable contact pads to maintain the article in the second orientation.

11. The method of claim 10, wherein gripping the article between the first and second rotatable contact pads of the robotic gripper includes displacing the first and second rotatable contact pads towards one another.

12. The method of claim 10, wherein rotating the first and second rotatable contact pads includes disengaging the brake.

13. The method of claim 12, wherein engaging the brake includes providing a pneumatic pressure to at least one diaphragm and disengaging the brake includes removing the pneumatic pressure from the at least one diaphragm.

14. The method of claim 12, wherein engaging the brake includes providing an electric potential to a dielectric material associated with the brake and disengaging the brake includes removing the electric potential from the dielectric material.

15. The method of claim 10, wherein engaging the brake includes applying a braking force independent of a gripping force applied to the article.

16. A method of operating a robotic gripper comprising:

gripping an article between a first rotatable contact pad and a second rotatable contact pad of a robotic gripper in a first orientation, wherein gripping the article includes applying a gripping force to the article via the first and second rotatable contact pads, wherein the first and second rotatable contact pads are positioned on different gripper fingers of the robotic gripper and are adapted to rotate relative to the different gripper fingers about a single common axis of rotation; and selectively applying a braking force to the first and second rotatable contact pads to selectively maintain the orientation of the first and second rotatable contact pads relative to the robotic gripper, wherein the braking force is independent of the gripping force.

17. The method of claim 16, wherein selectively applying the braking force includes providing or removing the braking force to rotate the first and second rotatable contact pads to pivot the article into a second orientation.

18. The method of claim 17, further comprising preventing rotation of the first and second rotatable contact pads to maintain the article in the second orientation.

* * * * *